(12) United States Patent
Zhang et al.

(10) Patent No.: US 9,765,884 B2
(45) Date of Patent: Sep. 19, 2017

(54) METHOD AND APPARATUS TO CONTROL A CONTINUOUSLY VARIABLE TRANSMISSION

(71) Applicant: GM GLOBAL TECHNOLOGY OPERATIONS LLC, Detroit, MI (US)

(72) Inventors: Zhen J. Zhang, Canton, MI (US); Paul G. Otanez, Troy, MI (US); Shushan Bai, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/935,574

(22) Filed: Nov. 9, 2015

(65) Prior Publication Data

US 2017/0130834 A1    May 11, 2017

(51) Int. Cl.
*F16H 61/662* (2006.01)
*F16H 9/18* (2006.01)

(52) U.S. Cl.
CPC ......... *F16H 61/66272* (2013.01); *F16H 9/18* (2013.01)

(58) Field of Classification Search
CPC ..... F16H 61/66231; F16H 2061/66277; F16H 61/66281; F16H 61/662
See application file for complete search history.

(56) References Cited

U.S. PATENT DOCUMENTS

| | | | |
|---|---|---|---|
| 6,243,638 B1 * | 6/2001 | Abo ................. | F16H 61/66254 474/18 |
| 2004/0254047 A1 * | 12/2004 | Frank .................. | B60K 6/36 477/37 |
| 2007/0232424 A1 * | 10/2007 | Nishida ............. | F16H 61/66259 474/28 |
| 2012/0090937 A1 | 4/2012 | Samie et al. | |
| 2012/0245807 A1 * | 9/2012 | Kurahashi ........ | F16H 61/66259 701/51 |
| 2013/0130863 A1 | 5/2013 | Xu et al. | |
| 2014/0074366 A1 | 3/2014 | Cui et al. | |

\* cited by examiner

*Primary Examiner* — Huan Le
(74) *Attorney, Agent, or Firm* — Quinn IP Law

(57) ABSTRACT

A powertrain system including an internal combustion engine rotatably coupled to a variator of a continuously variable transmission (CVT) is described. A method for controlling the CVT includes determining an actual speed ratio, a desired speed ratio and a commanded speed ratio. A total speed ratio change rate is determined based upon the actual speed ratio, the desired speed ratio and the commanded speed ratio, and a commanded speed ratio trajectory is determined based upon the desired speed ratio and the commanded speed ratio. A ratio change coefficient and a force ratio factor are determined based upon the commanded speed ratio trajectory, and a shift force is determined based upon the total speed ratio change rate and the ratio change coefficient. A primary pulley force and a secondary pulley force for the CVT are controlled based upon the shift force and the force ratio factor.

17 Claims, 2 Drawing Sheets

METHOD AND APPARATUS TO CONTROL A CONTINUOUSLY VARIABLE TRANSMISSION

TECHNICAL FIELD

This disclosure relates to a continuously variable transmission for a vehicle powertrain, and a method and control routine associated therewith.

BACKGROUND

Powertrains having an internal combustion engine coupled to a continuously or infinitely variable transmission (CVT) may be employed to provide tractive effort in vehicles. A CVT is capable of continuously changing an output/input speed ratio over a range between a minimum (underdrive) ratio and a maximum (overdrive) ratio, thus permitting infinitely variable selection of engine operation that achieves a preferred balance of fuel consumption and engine performance in response to an output torque request.

Known chain-type continuously variable transmissions include two pulleys, each having two sheaves. A chain runs between the two pulleys, with the two sheaves of each of the pulleys sandwiching the chain therebetween. Frictional engagement between the sheaves of each pulley and the chain couples the chain to each of the pulleys to transfer torque from one pulley to the other. One of the pulleys may operate as a drive or input pulley and the other pulley may operate as a driven or output pulley. The gear ratio is the ratio of the torque of the driven pulley to the torque of the drive pulley. The gear ratio may be changed by urging the two sheaves of one of the pulleys closer together and urging the two sheaves of the other pulley farther apart, causing the chain to ride higher or lower on the respective pulley.

SUMMARY

A powertrain system including an internal combustion engine rotatably coupled to a variator of a continuously variable transmission (CVT) is described. A method for controlling the CVT includes determining an actual speed ratio, a desired speed ratio and a commanded speed ratio. A total speed ratio change rate is determined based upon the actual speed ratio, the desired speed ratio and the commanded speed ratio, and a commanded speed ratio trajectory is determined based upon the desired speed ratio and the commanded speed ratio. A ratio change coefficient and a force ratio factor are determined based upon the commanded speed ratio trajectory, and a shift force is determined based upon the total speed ratio change rate and the ratio change coefficient. A primary pulley force and a secondary pulley force for the CVT are controlled based upon the shift force and the force ratio factor.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
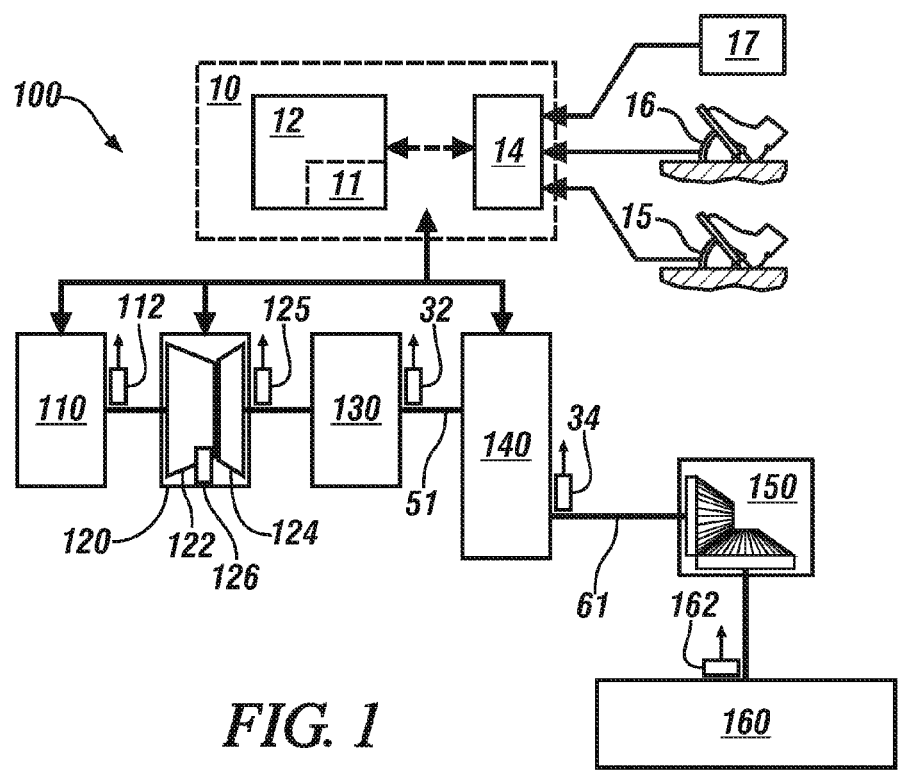
FIG. 1 schematically illustrates elements of a powertrain system that includes an internal combustion engine rotatably coupled to a continuously variable transmission (CVT) via a torque converter and a gear box, in accordance with the disclosure.

Referring now to the drawings, wherein the depictions are for the purpose of illustrating certain exemplary embodiments only and not for the purpose of limiting the same, FIG. 1 schematically illustrates elements of a powertrain system 100 that includes an internal combustion engine (engine) 110 rotatably coupled to a continuously variable transmission (CVT) 140 via a torque converter 120 and a gear box 130. The powertrain system 100 couples via a driveline 150 to a vehicle wheel 160 to provide tractive effort when employed on a vehicle. Operation of the powertrain system 100 is monitored by and controlled by a control system 10 in response to driver commands and other factors.

The engine 110 may be any suitable internal combustion engine capable of transforming hydrocarbon fuel to mechanical power to generate torque in response to commands originating from the control system 10. The torque converter 120 is a device providing fluidic coupling between its input and output members for transferring torque, and preferably includes a pump 122 that is coupled to the engine 110, a turbine 124 that is coupled via the output member to the gear box 130 and a torque converter clutch 126 that locks rotation of the pump 122 and turbine 124 and is controllable by the control system 10. The output member of the torque converter 120 rotatably couples to the gear box 130, which includes meshed gears or other suitable gearing mechanisms that provide reduction gearing between the torque converter 120 and the CVT 140. Alternatively the gear box 130 may be another suitable gear configuration for providing gearing between the engine 110, the torque converter 120 and the CVT 140, including, by way of non-limiting examples, a chain drive gear configuration or a planetary gear configuration. In alternative embodiments, either or both the torque converter 120 and the gear box 130 may be omitted.

The gear box 130 includes an output member that rotatably couples to the CVT 140 via an input member 51. One embodiment of the CVT 140 is described with reference to FIG. 2. An output member 61 of the CVT 140 rotatably couples to the driveline 150, which rotatably couples to the vehicle wheels 160 via an axle, half-shaft or another suitable torque transfer element. The driveline 150 may include a differential gearset, a chain drive gearset or another suitable gear arrangement for transferring torque to one or more vehicle wheels 160.

The powertrain system 100 preferably includes one or more sensing devices for monitoring rotational speeds of various devices, including, e.g., an engine speed sensor 112, a torque converter turbine speed sensor 125, a CVT variator input speed sensor 32, a CVT variator output speed sensor 34, and a wheel speed sensor 162. Each of the aforementioned speed sensors may be any suitable position/speed sensing device, such as a Hall-effect sensor. Each of the aforementioned speed sensors communicates with the control system 10. As used herein the term 'speed' and related terms refer to a rotational speed of a rotating member, unless specifically indicated otherwise. As used herein the term 'position' and related terms refer to a rotational or angular position of a rotating member, unless specifically indicated otherwise.

The control system 10 preferably includes one or a plurality of controllers 12 and a user interface 14. A single controller 12 is shown for ease of illustration. The controller 12 may include a plurality of controller devices wherein each of the controllers 12 is associated with monitoring and controlling a single system. This may include an engine control module (ECM) for controlling the engine 110 and a transmission controller (TCM) for controlling the CVT 140 and for monitoring and controlling a single subsystem, e.g., a torque converter clutch. The controller 12 preferably includes a memory device 11 containing executable instruction sets. The user interface 14 communicates with and monitors operator input devices including, e.g., an accelerator pedal 15, a brake pedal 16 and a transmission gear selector 17. The user interface 14 determines an operator torque request based upon the aforementioned operator inputs. In one embodiment, the transmission gear selector 17 includes a tap-up/tap-down feature, whereby a vehicle operator may manually select a transmission gear ratio, thus overriding transmission control. A tap-up command results in a command to the CVT 140 to increase its gear ratio, which is accomplished by increasing a speed ratio in the CVT 140. A tap-down command results in a command to the CVT 140 to decrease its gear ratio by decreasing the speed ratio in the CVT 140.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figure 2:
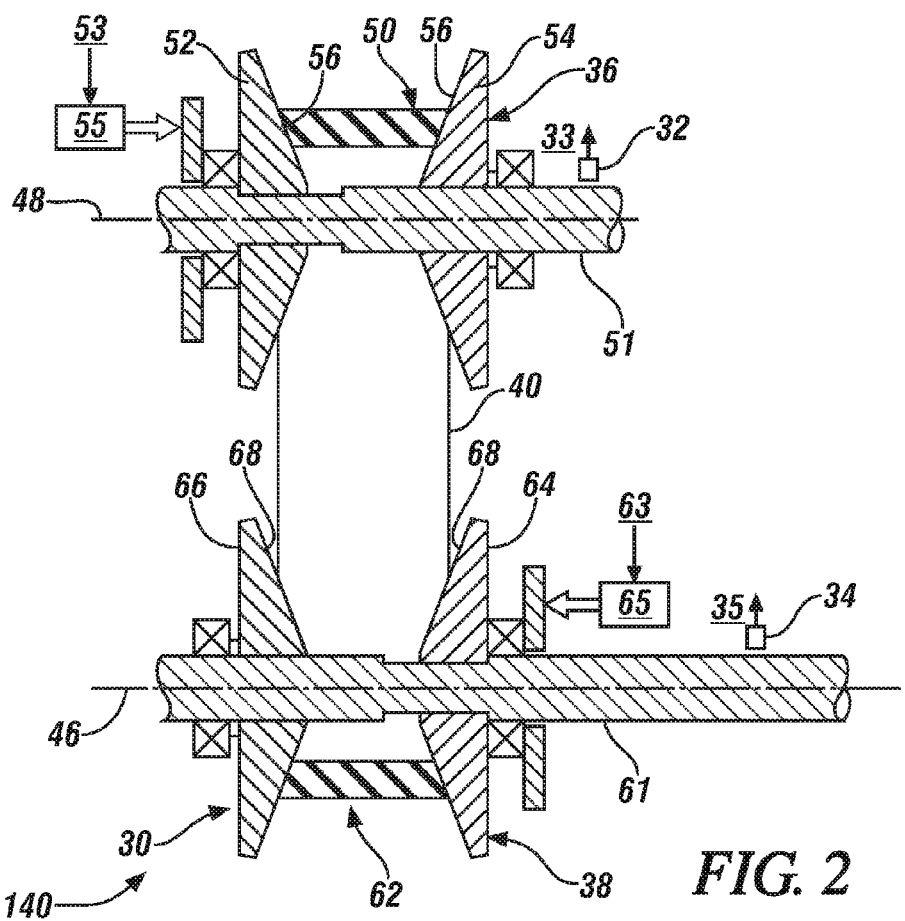
FIG. 2 schematically illustrates elements of a variator of a chain-type CVT, in accordance with the disclosure.

FIG. 2 schematically illustrates elements of a variator 30 of a chain-type continuously variable transmission (CVT) 140 that is advantageously controlled by a controller 12. The variator 30 transfers torque between the first rotating member 51 and the second rotating member 61. The first rotating member 51 is nominally referred to herein as input member 51, and the second rotating member 61 is nominally referred to herein as output member 61.

The variator 30 includes a first, or primary pulley 36, a second, or secondary pulley 38 and flexible continuous rotatable device 40 that rotatably couples the first and second pulleys 36, 38 to transfer torque therebetween. The first pulley 36 rotatably attaches to the input member 51 and the second pulley 38 rotatably attaches to the output member 61, and the rotatable device 40 is adapted to transfer torque between the first and second pulleys 36, 38 and thus between the input and output members 51, 61. The first pulley 36 and input member 51 rotate about a first axis 48, and the second pulley 38 and output member 61 rotate about a second axis 46. The continuous rotatable device 40 can be a belt, a chain, or another suitable flexible continuous device. The input speed sensor 32 may be mounted near the input member 51 to generate a CVT input speed 33 that relates to a speed of the first, input pulley 36, and the output speed sensor 34 may be mounted near the output member 61 to generate a CVT output speed 35 that relates to a speed of the second, output pulley 38. One of the first and second pulleys 36, 38 acts as a ratioing pulley to establish a speed ratio and the other of the first and second pulleys 36, 38 acts as a clamping pulley to generate sufficient clamping force to transfer torque therebetween. As used herein, the term 'speed ratio' refers to a variator speed ratio, which is a ratio of a CVT output speed and a CVT input speed. The CVT input speed may be determined based upon a signal input from one of the engine speed sensor 112, the torque converter turbine speed sensor 125, or the input speed sensor 32, as described herein, or another suitable speed/position sensor. The CVT output speed may be determined based upon a signal input from the output speed sensor 34 or the wheel speed sensor 162 as described herein, or another suitable speed/position sensor. The speed ratio parameters are determined based upon the CVT input speed and the CVT output speed.

The first pulley 36 is split perpendicular to the first axis 48 to define an annular first groove 50 that is formed between a moveable sheave 52 and a stationary sheave 54. The moveable sheave 52 axially moves or translates along the first axis 48 relative to the stationary sheave 54. For example, the moveable first sheave 52 may be attached to the input member 51 via a splined connection, thereby allowing axial movement of the moveable first sheave 52 along the first axis 48. The stationary first sheave 54 is disposed opposite the moveable first sheave 52. The stationary first sheave 54 is axially fixed to the input member 51 along the first axis 48. As such, the stationary first sheave 54 does not move in the axial direction of the first axis 48. The moveable first sheave 52 and the stationary first sheave 54 each include a first groove surface 56. The first groove surfaces 56 of the moveable first sheave 52 and the stationary first sheave 54 are disposed opposite each other to define the annular first groove 50 therebetween. The opposed first grooved surfaces 56 preferably form an inverted frustoconical shape such that a movement of the moveable first sheave 52 towards the stationary first sheave 54 increases an outer pulley diameter of the annular first groove 50. An actuator 55 is arranged with the first pulley 36 to control an axial position of the moveable first sheave 52 in response to a drive signal 53, including urging the moveable first sheave 52 towards the stationary first sheave 54. In one embodiment, the actuator 55 is a hydraulically-controlled device and the drive signal 53 is a hydraulic pressure signal.

The second pulley 38 is split perpendicular to the second axis 46 to define an annular second groove 62 therebetween. The annular second groove 62 is disposed perpendicular to the second axis 46. The second pulley 38 includes a moveable sheave 64 and a stationary sheave 66. The moveable sheave 64 axially moves or translates along the second axis 46 relative to the stationary sheave 66. For example, the moveable second sheave 64 may be attached to the output member 61 via a splined connection, thereby allowing axial movement of the moveable second sheave 64 along the second axis 46. The stationary second sheave 66 is disposed opposite the moveable second sheave 64. The stationary second sheave 66 is axially fixed to the output member 61 along the second axis 46. As such, the stationary second sheave 66 does not move in the axial direction of the second axis 46. The moveable second sheave 64 and the stationary second sheave 66 each include a second groove surface 68. The second groove surfaces 68 of the moveable second sheave 64 and the stationary second sheave 66 are disposed opposite each other to define the annular second groove 62 therebetween. The opposed second grooved surfaces 68 preferably form an inverted frustoconical shape such that a movement of the moveable second sheave 64 towards the stationary second sheave 66 increases an outer pulley diameter of the annular second groove 62. An actuator 65 is arranged with the second pulley 38 to control an axial position of the moveable second sheave 64 in response to a driven signal 63, including urging the moveable second sheave 64 towards the stationary second sheave 66. In one embodiment, the actuator 65 is a hydraulically-controlled device and the driven signal 63 is a hydraulic pressure signal. A ratio of the outer pulley diameter of the first pulley 36 and the outer pulley diameter of the second pulley 38 defines a transmission torque ratio. Other elements, such as clutch assemblies in the form of selectable one-way clutches and the like may be deployed between the variator 30 and other powertrain and driveline components and systems.

Figure 3:
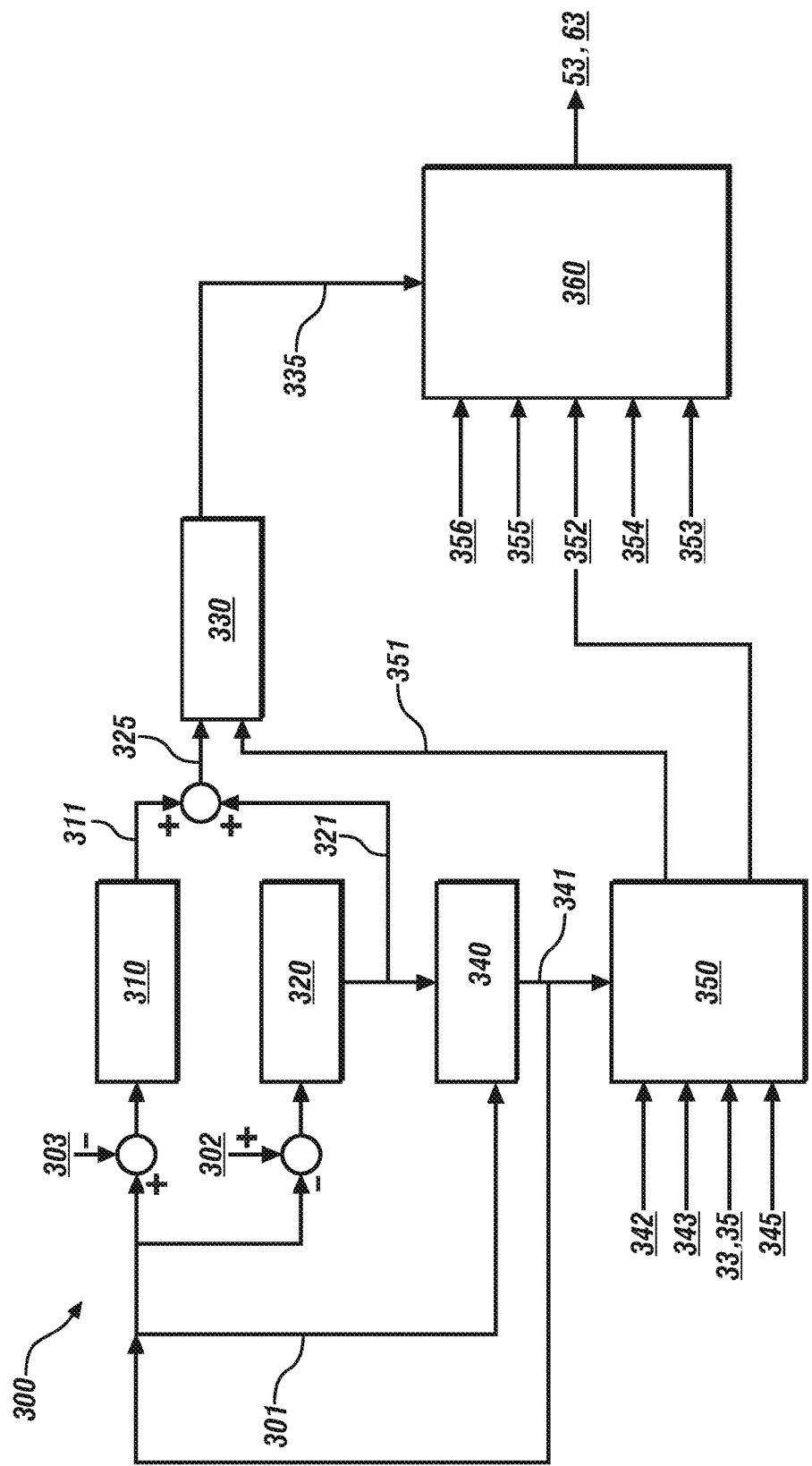
FIG. 3 schematically shows a block diagram of a speed ratio control routine that can be employed in controlling a variator speed ratio in a CVT, in accordance with the disclosure.

FIG. 3 schematically shows a block diagram of a speed ratio control routine (routine) 300 that may be advantageously employed in controlling a speed ratio in a CVT, including an embodiment of the CVT 140 shown with reference to FIGS. 1 and 2. The CVT speed ratio is controlled by controlling a primary pulley force and a secondary pulley force, which may be calculated or otherwise determined based on a minimum pulley clamping force, a shift force, and an Ide model, as described herein. In certain embodiments, the primary pulley force and the secondary pulley force are described in terms of a primary pulley pressure and a secondary pulley pressure, respectively.

Speed ratio parameters of the routine 300 include a commanded speed ratio 301, a desired speed ratio 302 and an actual speed ratio 303. The actual speed ratio 303 indicates a present, measured value for the speed ratio and is determined based upon a ratio of measured output and input speeds, e.g., the CVT input speed 33 as measured by the input speed sensor 32 and the CVT output speed 35 as measured by the output speed sensor 34. The desired speed ratio 302 is a preferred speed ratio for operating the CVT 140 in the powertrain system 100 that is responsive to the operator torque request and balances or otherwise accounts for factors related to drivability, fuel consumption, emissions, and other operating conditions that may be monitored or estimated and relate to an output power command, vehicle speed and engine torque. The commanded speed ratio 301 is a speed ratio that is determined by the controller 12 that is achievable with zero steady-state tracking error and provides quick and smooth responsiveness. As described herein, the controller 12 controls the CVT 140 to achieve the desired speed ratio by controlling pressures of one or both the primary pulley 36 and the secondary pulley 38 of the CVT 140. Controlling pressures of one or both the primary pulley 36 and the secondary pulley 38 of the CVT 140 can be achieved by controlling the drive and driven signals 13, 15 to apply requisite pressures to the first and second actuators 55, 65 to effect the desired speed ratio, wherein the requisite pressures are preferably in the form of a primary pressure command and a secondary pressure command.

A first portion of the routine 300 includes using feed-forward control and feedback control to determine a total speed ratio change rate 325 based upon the commanded speed ratio 301, the desired speed ratio 302 and the actual speed ratio 303. The feedback control employs controller 310 that determines a feedback ratio rate 311 based upon a difference between the commanded speed ratio 301 and the actual speed ratio 303. The controller 310 may be any suitable feedback control device, including by way of non-limiting examples, a proportional-integral-derivative (PID) controller, an optimal robust controller, or a model predictive control (MPC) device. The feed-forward control employs a feed-forward controller 320 that determines a feed-forward ratio rate 321 based upon a difference between the commanded speed ratio 301 and the desired speed ratio 302. The total speed ratio change rate 325 may be determined by combining the feedback ratio rate 311 and the feed-forward ratio rate 321, for example by calculating an arithmetic sum thereof. The feed-forward ratio rate 321 and the commanded speed ratio 301 are evaluated in a trajectory controller 340, which determines a commanded speed ratio trajectory 341 based thereon. The commanded speed ratio trajectory 341 is a time-rate change in the commanded speed ratio 301. As such, the ratio control includes both feedback and feed-forward ratio control to determine the total speed ratio change rate 325, and using feed-forward control to determine the commanded speed ratio trajectory 341. The total speed ratio change rate 325 may be employed by a shift force calculation routine 330 to determine a commanded shift force (FShift-cmd) 335, as will be described herein. Mechanical limitations of the powertrain system 100 including the engine 110, torque converter 120, gear box 130 and CVT 140 including both hardware and hydraulic capabilities are taken into consideration when determining the total speed ratio change rate 325 based upon the commanded speed ratio 301. Furthermore, when a step change in the commanded speed ratio 301 is commanded, the total speed ratio change rate 325 may vary, and it may be necessary to determine whether changes in engine torque management and/or changes in engine speed requests are needed for rapid and timely ratio response.

The commanded speed ratio trajectory 341 is input to an Ide model 350, which determines a ratio change coefficient 351 based upon the commanded speed ratio trajectory 341 for an embodiment of the CVT 140, and determines a force ratio factor (KpKs) 352 for the relationship of primary pulley force and secondary pulley force. The Ide model 350 includes processor-executable code and an associated calibration that simulates physical relationships associated with operation of an embodiment of the CVT 140. Ide models and their development and implementation are known and thus not described in detail herein. The physical relationships may be reduced to the following executable relationship for a variator ratio derivative $\dot{r}$. The variator ratio derivative $\dot{r}$ may be represented as follows, and is based upon the feedback ratio rate 311 and the feed-forward ratio rate 321:

$$\dot{r} = k(VSR, \omega_p) * F_{shift} \quad [1]$$

The shift force $F_{shift}$ may be determined as follows:

$$F_{shift} = \frac{1}{k} * (\text{total speed ratio change rate})$$

The terms of Eqs. 1 and 2 include as follows:
$\omega_p$ is the CVT input speed;
VSR is the desired speed ratio 302;
k is the ratio change coefficient 351; and
the total speed ratio change rate is an arithmetic sum of the feedback ratio rate 311 and the feed-forward ratio rate 321.

Thus, the force associated with the first, or primary pulley 36 may be determined as follows:

$$F_{prim} = KpKs * F_{sec} + F_{shift} \quad [3]$$

wherein
$F_{prim}$ is a force associated with the first, or primary pulley 36, which takes into account related pressure forces and centrifugal forces;
$F_{sec}$ is a force associated with the second, or secondary pulley 38, which takes into account related pressure forces, centrifugal forces, and spring forces; and
KpKs is the force ratio factor.

Under steady state operating conditions, the force ratio factor may be determined as follows.

$$KpKs = F_{prim}/F_{sec} \text{ and } F_{shift} = 0 \quad [4]$$

The relationship for the variator ratio derivative $\dot{r}$ described with reference to Eqs. 1 and 2 may be developed for an embodiment of the CVT 140 employing empirical data that may be collected for a range of speed, load and speed ratio conditions and analyzed to determine states for the various factors and coefficients. The force ratio factor KpKs 352 represents a ratio of $F_{prim}$ and $F_{sec}$ that accounts for forces from hydraulic pressure, centrifugal pressure and spring force, and may be empirically derived employing the Ide model 350 employing the commanded speed ratio 301 and a torque capacity ratio 342. The force ratio factor KpKs 352 is dependent upon an input pulley torque 343, CVT input speed 33, CVT output speed 35, transmission fluid temperature 345, transmission fluid quality and other factors, and may be empirically determined. The ratio change coefficient k 351 is a calibrated term that is determined using empirical data related to operation of an embodiment of the CVT 140. The ratio change coefficient k 351 and the total speed ratio change rate 325 are employed by the shift force calculation routine 330 to determine the commanded shift force Fshift-cmd 335. The commanded shift force Fshift-cmd 335 is a magnitude of additional force exerted on the first pulley 36 or the second pulley 38 to change the speed ratio in response to a commanded shift.

A pulley pressure determination routine 360 employs the commanded shift force Fshift-cmd 335 and the force ratio factor KpKs 352 to determine primary and secondary pulley pressure commands for controlling the CVT 140, taking into account minimum pulley clamping forces 356, centrifugal forces 355, spring forces 354 and torque force coefficients 353. The minimum pulley clamping forces 356, centrifugal forces 355, spring forces 354 and torque force coefficients 353 are application-specific parameters that may be determined based upon empirical relationships. As such, the primary and secondary pulley pressure commands for controlling the CVT 140 are based on the desired forces, including clamping and feedback correction forces, and the hydraulic characteristics of the transmission at the specific operating conditions.

The pulley pressure determination routine 360 determines the primary pulley pressure command, e.g., the drive signal 13 for the variator 30 described with reference to FIG. 2, and also determines the secondary pulley pressure command, e.g., the driven signal 15 for the variator 30 described with reference to FIG. 2, to control actuators of the CVT 140 to adjust the speed ratio of the CVT 140.

The speed ratio control routine 300 facilitates tracking the commanded speed ratio to achieve a zero steady-state tracking error with quick and smooth responsiveness. This includes determining a commanded ratio trajectory and commanded ratio change rate based on the desired speed ratio and the actual speed ratio using feed-back and feed-forward control routines. Hardware capability limitations are also considered when determining the commanded ratio, for example if line pressure or flow capability are not great enough to fulfil the task. When a step ratio change is commanded, it is necessary to determine whether engine torque management and/or engine speed requests are needed for quick and smooth ratio response. The force ratio factor KpKs 352 is used to determine the relationship between the primary pulley force and the secondary pulley force for ratio control. Such operation facilitates calculating the force on the ratioing pulley in relation to the minimum pulley clamping force 356 and the force ratio factor KpKs 352. Such operation further enables selecting either the first pulley 36 or the second pulley 38 as the clamping pulley based on the desired forces including clamping and feedback correction forces and the hydraulic characteristics of the transmission at the particular operating condition.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instructions to implement the function or act specified in the flowchart.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a continuously variable transmission (CVT), the method comprising:
    determining an actual speed ratio, a desired speed ratio and a commanded speed ratio;
    determining a total speed ratio change rate based upon the actual speed ratio, the desired speed ratio and the commanded speed ratio;
    determining a commanded speed ratio trajectory based upon the desired speed ratio and the commanded speed ratio;
    determining a ratio change coefficient and a force ratio factor based upon the commanded speed ratio trajectory;
    determining a commanded shift force based upon the total speed ratio change rate and the ratio change coefficient; and
    controlling a primary pulley force and a secondary pulley force for the CVT based upon the commanded shift force and the force ratio factor.

2. The method of claim 1, wherein determining the total speed ratio change rate based upon the actual speed ratio, the desired speed ratio and the commanded speed ratio comprises:
    determining a feedback ratio rate based upon a difference between the commanded speed ratio and the actual speed ratio;
    determining a feed-forward ratio rate based upon a difference between the commanded speed ratio and the desired speed ratio; and
    combining the feedback ratio rate and the feed-forward ratio rate.

3. The method of claim 1, wherein determining the ratio change coefficient based upon the commanded speed ratio trajectory comprises analyzing empirical data to develop a relationship for a variator ratio derivatives in accordance with the following equations:

$$\dot{r} = k(VSR, \omega_p) * F_{shift} \text{ and}$$

$$F_{shift} = \frac{1}{k} * (\text{total speed ratio change rate})$$

wherein:
k is the ratio change coefficient,
VSR is the desired speed ratio,
$F_{shift}$ is the commanded shift force,
$\omega_p$ is CVT input speed,
KpKs is the force ratio factor, and
the total speed ratio change rate is an arithmetic sum of a feedback ratio change rate and a feed-forward ratio change rate.

4. The method of claim 3, wherein the force ratio factor is determined based upon empirical data related to a primary pulley of a variator of the CVT and a secondary pulley of the variator of the CVT.

5. The method of claim 1, wherein controlling the primary pulley force for the CVT based upon the commanded shift force and the force ratio factor comprises controlling a primary command to drive an actuator of a moveable sheave of the primary pulley of a variator of the CVT in response to the commanded shift force and the force ratio factor.

6. The method of claim 1, wherein controlling the secondary pulley force for the CVT based upon the commanded shift force and the force ratio factor comprises controlling a secondary command to drive an actuator of a moveable sheave of the secondary pulley of a variator of the CVT in response to the commanded shift force and the force ratio factor.

7. The method of claim 1, wherein the actual speed ratio comprises a measured value determined based upon a ratio of a CVT input speed and a CVT output speed.

8. The method of claim 1, wherein the desired speed ratio comprises a speed ratio for operating the CVT that is responsive to an operator torque request and speed.

9. The method of claim 1, wherein the commanded speed ratio comprises a speed ratio that is achievable with a zero steady-state tracking error.

10. The method of claim 1, wherein controlling the primary pulley force and the secondary pulley force for the CVT comprises controlling a primary pulley pressure and a secondary pulley pressure for the CVT.

11. A method for controlling a continuously variable transmission (CVT), the method comprising:
    determining a commanded speed ratio trajectory based upon a desired speed ratio, an actual speed ratio and a commanded speed ratio;
    determining a ratio change coefficient and a force ratio factor based upon the commanded speed ratio trajectory;
    determining a shift force based upon a total speed ratio change rate and the ratio change coefficient; and
    controlling a primary pulley pressure and a secondary pulley pressure for the CVT based upon the shift force and the force ratio factor.

12. The method of claim 11, further comprising controlling the primary pulley pressure and the secondary pulley pressure for the CVT based upon the shift force, the force ratio factor, a minimum pulley clamping force, a centrifugal force and a spring force.

13. A continuously variable transmission, comprising:
    a variator including a first pulley and a second pulley, the first and second pulleys rotatably couple by a flexible continuous rotatable device, wherein the first pulley rotatably couples to an input member and the second pulley rotatably couples to an output member;
    the first pulley including a first moveable sheave that translates along a first axis relative to a first stationary sheave in response to urging of a first actuator;
    the second pulley including a second moveable sheave that translates along a second axis relative to a second stationary sheave in response to urging of a second actuator;
    a controller, in communication with a first sensor configured to monitor a first speed associated with the first pulley and a second sensor configured to monitor a second speed associated with the second pulley, and operatively connected to the first and second actuators;
    the controller including an instruction set, the instruction set executable to:
    determine an actual speed ratio, a desired speed ratio and a commanded speed ratio, determine a total speed ratio change rate based upon the actual speed ratio, the desired speed ratio and the commanded speed ratio, determine a commanded speed ratio trajectory based upon the desired speed ratio and the commanded speed ratio, determine a ratio change coefficient and a force ratio factor based upon the commanded speed ratio trajectory, determine a shift force based upon the total speed ratio change rate and the ratio change coefficient, and control the first actuator and the second actuator based upon the shift force and the force ratio factor.

14. The transmission of claim 13, wherein the executable instruction set to determine the total speed ratio change rate based upon the actual speed ratio, the desired speed ratio and the commanded speed ratio comprises an instruction set executable to:

determine a feedback ratio rate based upon a difference between the commanded speed ratio and the actual speed ratio;

determine a feed-forward ratio rate based upon a difference between the commanded speed ratio and the desired speed ratio; and combine the feedback ratio rate and the feed-forward ratio rate to determine the total speed ratio change rate.

15. The transmission of claim 13, wherein the force ratio factor is determined based upon empirical data related to the force on the first pulley and the force on the second pulley.

16. The transmission of claim 13, wherein the executable instruction set to control the first actuator and the second actuator based upon the shift force and the force ratio factor comprises an instruction set executable to control a primary pressure command to drive the first actuator to urge the moveable sheave of the first pulley of the variator of the CVT in response to the shift force and the force ratio factor.

17. The transmission of claim 13, wherein the executable instruction set to control the first actuator and the second actuator based upon the shift force and the force ratio factor comprises an instruction set executable to control a secondary pressure command to drive the second actuator to urge the moveable sheave of the second pulley of the variator of the CVT in response to the shift force and the force ratio factor.

* * * * *